United States Patent [19]

Conley et al.

[11] Patent Number: 5,233,554

[45] Date of Patent: Aug. 3, 1993

[54] PROGRAMMABLE OPTICAL CORRELATOR

[75] Inventors: William F. Conley, Port St. Lucie; John H. Mitchell, Palm Beach Gardens, both of Fla.

[73] Assignee: United Technologies Corporation, Hartford, Conn.

[21] Appl. No.: 580,230

[22] Filed: Sep. 10, 1990

[51] Int. Cl.⁵ .................. G03B 1/16; G02B 27/42
[52] U.S. Cl. .................... 364/822; 359/559; 359/561; 359/560
[58] Field of Search ............ 364/822, 845, 837; 359/559, 560, 561, 22, 29, 619; 395/25; 382/42

[56] References Cited

U.S. PATENT DOCUMENTS

| | | | |
|---|---|---|---|
| 4,442,455 | 4/1984 | Huignard et al. | 358/209 |
| 4,496,222 | 1/1985 | Shah | 350/354 |
| 4,514,038 | 4/1985 | Pichon et al. | 350/162 |
| 4,542,955 | 9/1985 | Graindorge et al. | 350/3.63 |
| 4,674,824 | 6/1987 | Goodman et al. | 350/3.64 |
| 4,695,973 | 9/1987 | Yu | 364/822 |
| 4,703,993 | 11/1987 | Hinton et al. | 350/3.72 |
| 4,722,594 | 2/1988 | Crossland et al. | 350/350 |
| 4,726,639 | 2/1988 | Brody | 350/3.64 |
| 4,767,197 | 8/1988 | Yeh | 364/845 |
| 4,837,843 | 6/1989 | Owechko | 359/22 |
| 4,948,212 | 8/1990 | Cheng et al. | 359/561 |
| 4,961,615 | 10/1990 | Owechko et al. | 359/561 |
| 5,068,801 | 11/1991 | Clark et al. | 364/822 |
| 5,150,228 | 9/1992 | Liu et al. | 359/559 |

OTHER PUBLICATIONS

"Storage of Holograms in a Ferroelectric Photoconductor Device", Applied Physics Letters, Aug. 18, 1970, vol. 17, No.4, S. A. Keneman et al.

Primary Examiner—Jerry Smith
Assistant Examiner—Jim Trammell
Attorney, Agent, or Firm—Peter R. Ruzek

[57] ABSTRACT

An optical correlation system employing the degenerate four wave mixing uses cross-polarized pump and probe beams to prevent the writing of a volume transmission phase hologram in a photorefractive crystal having an applied electric field parallel to the optic axis of the system, so that system response does not depend on the time required to write or erase such a transmission hologram.

5 Claims, 2 Drawing Sheets

PROGRAMMABLE OPTICAL CORRELATOR

DESCRIPTION

1. Technical Field

The field of the invention is that of optical signal processing, in particular that of pattern recognition.

2. Background Art

Use of correlation techniques in optical signal processing provides the well-known advantage that the processing is done in parallel and is thus much faster than an equivalent digital process performed electronically and sequentially. The use of digital electronics for real-time applications is not generally possible because of the necessary computation time. Optical correlators employing degenerate four-wave mixing (DFWM) in the prior art have suffered from a variety of drawbacks. Some have not been programmable and were thus limited to one comparison image perspective, and others have not had sufficient dynamic range to be useable for real applications. U.S. Pat. No. 4,722,594 illustrates in FIG. 5 a correlator in which two lasers are used to produce a DFWM mixing correlation in a transmission geometry, first producing two reflected images that are Fourier-transformed and directed onto a bismuth silicon oxide material, together with a planar readout beam; after which the correlated output is inverse transformed and is detected. This approach requires extra alignment of an additional inverse Fourier Transform lens and suffers from unseparated background illumination that is incident on the detector. The use of this transmission geometry forfeits the aberration corrections that are possible with reflection mode DFWM. U.S. Pat. No. 4,695,973 also uses two Fourier lenses, with associated alignment problems, but in addition uses a two-step correlation process. Images are digitized (a slow process) and displayed on magneto-optic a spatial light modulator (MOSLM). A transmission geometry is employed in which a first laser beam is modulated by transmission through the MOSLM and the modulated beam is Fourier transformed and directed on to a liquid crystal light valve (LCLV) that converts the Fourier spectrum to a coherent power spectrum. A second laser directs a beam to reflect off the LCLV in another beam that is inverse Fourier transformed and directed on to a detector. This approach suffers from disadvantages similar to the previous one. There are alignment problems and expenses associated with the extra lens and the two lasers and two modulators, as well as background noise and lack of aberration correction.

DISCLOSURE OF INVENTION

The invention relates to a real-time optical correlator in which an image from an unknown object is compared in a degenerate four-wave mixing process with a reference image that may be changed in real time. The output signal from the four-wave mixing process contains the cross-correlation between the input scene and the reference image.

Other features and advantages will be apparent from the specification and claims and from the accompanying drawing which illustrates an embodiment of the invention.

BRIEF DESCRIPTION OF DRAWINGS

FIG. 4 illustrates a photorefractive crystal used with the invention.

BEST MODE FOR CARRYING OUT THE INVENTION

Figure 1:
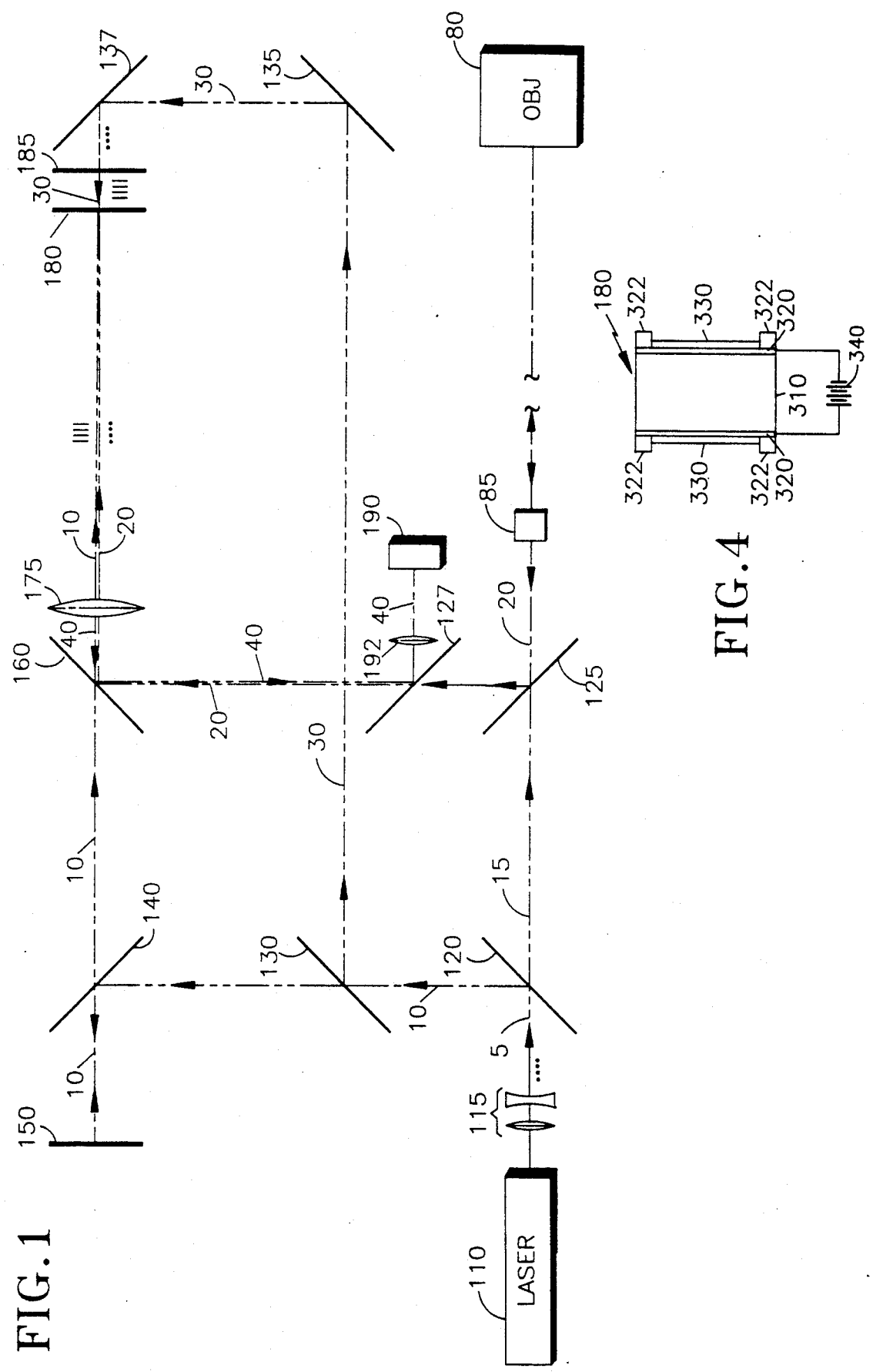
FIG. 1 illustrates in partially pictorial, partially schematic form an embodiment of the invention.

In FIG. 1, an object 80 at the lower right-hand corner of the drawing is the object to be scrutinized. On the lower left-hand corner of the drawing is a laser 110 that generates the various beams that are used in the correlator. In the upper left-hand corner of the drawing is a spatial-light modulator (SLM) 150, which may be a commercially available liquid crystal display reflecting one of the beams from laser 110 or any other convenient apparatus for impressing a reference image on the beam striking it. Preferably, the SLM will be electronically addressed, so that the reference image can be changed quickly. In the upper right-hand corner of the drawing is a photo-refractive crystal 180 within which an output will be generated by the four-wave mixing process to produce the correlation of interest.

Laser 110 generates a beam that is collimated by telescope 115 and proceeds to the right in the drawing as beam 5. Beam splitter 120 passes a portion of beam 5 as beam 15 which goes out to object 80 through telescope 85, returning as image beam 20. Beam splitter 120 also deflects beam 10 upwardly in the drawing through beam splitter 130. A portion of beam 10 travels to the right as pump beam 30 and the remainder is reflected off beam splitter 140 to spatial modulator 150 to provide a coherent reference. Beam 10 is then reflected off spatial modulator 150 and travels to the right, now carrying a pattern impressed upon it by the reflectivity pattern in the portion of spatial modulator 150 that the beam strikes.

Spatial modulator 150 may be a liquid crystal display carrying a reference image of a sample that is to be compared with the object. The advantage of using a liquid crystal display or any other similar optically addressable device is that the display may be changed rapidly to compare a number of reference images with the object under scrutiny in real time.

The modulated reference beam 10 passes to the right along the top of the drawing through polarizing beam splitter (PBS) 160, which passes the component polarized parallel to the plane of the paper, and then through Fourier transform lens 175 where it is focused on crystal 180. SLM 150 and crystal 180 are both located one focal length away from lens 175. Beam 10 is the probe beam of the four-wave mixing process.

The first strong pump beam also comes from laser 110 and is separated from beam 10 by beam splitter 130, traveling to the right along the middle of the drawing as beam 30. Beam 30 is deflected upward by mirror 135 and to the left by mirror 137. Traveling to the left off mirror 137, it is polarized perpendicular to the plane of paper. Polarization rotation plate 185 rotates the polarization of beam 30 to align the polarizations of reference beam 30 and object beam 10.

The third input beam and the second pump beam in the four-wave mixing process is the image beam 20 reflected from object 80, which may be another SLM, an object being inspected on an assembly line, an aircraft or any other source of a pattern to be compared with the reference pattern on SLM 150. Beam 20 passes through telescope 85 again and is deflected upward by beam splitter 125 through beam splitter 127. The s component of beam 20 is reflected to the right by beam splitter 160, polarized perpendicular to the plane of the paper. The p component passes through beam splitter 160 and is discarded. The s component, still referred to by the numeral 20, then passes through lens 175 and is focused into crystal 180 along with beam 10. Beam 20 strikes the lower surface of splitter 160 with an angular offset angle $\theta_s$ from the axis of beam 10, so that beams 10 and 20 are displaced slightly as they leave beam splitter 160 and thus enter crystal 180 at a small angle to intersect beam 30 within the crystal. The displacement is shown in the plane of the paper for convenience, but other orientations are acceptable. Beams 20 and 30, the pump beams, will be collinear in crystal 180.

In crystal 180, image beam 20 and pump beam 30 produce negligible interference and do not form a holographic grating since they are cross-polarized. The grating formed within crystal 180 is formed by the significant interference of beams 10 and 30, which are both polarized in the plane of the paper. If the crystal is optically active, the polarization state of the beams can be precompensated to ensure that they meet in the correct polarization states. The lack of interference between beams 20 and 30 is an advantage of the invention since 1) correlation times are not increased by the time required to "write" an additional grating between beams 20 and 30, and 2) back-scattering noise resulting from such a secondary grating is minimized. Beam 10 interferes reasonably efficiently with pump beam 30, since beam 10 and beam 30 meet at nearly 180°, (defining the angle of incidence to be $(180° - \theta_s)/2$). For purposes of this application, the term "grazing angle" will be used to distinguish a configuration such as that shown in FIG. 1 from other configurations used in the past, in which the beams intersect at a large angle (30 degrees or more) or have axes that are parallel and displaced from one another. By this term grazing angle is meant an angle such that the axes of the two beams are separated within the apparatus, such as at beam splitter 160 or lens 175 and intersect within the interaction region in photoreactive medium 180. There could, of course, be some overlap of the beams at beam splitter 160 and/or a close approach of skew axes within medium 180, either from misalignment or deliberately, and still come within the meaning of this term.

As a result of the well-known four-wave mixing process, a beam will emerge from crystal 180 traveling along as beam 40 to the left in the drawing collinear to and traveling in the opposite direction to beam 10. This beam 40 is collimated by Fourier transform lens 175 and is reflected by beam splitter 160 downwardly in the drawing. Beam 40 is deflected to the right by beam splitter 127 and focused by lens 192 on detector array 190, which sends out electrical signals representing the output intensity distribution on it. Beam 40 will travel downward at the separation angle $\theta_s$ with respect to beam 20 because it is collinear with beam 10, which is offset from beam 20 in beamsplitter 160.

Since beam 10 is collimated and is reflected off an essentially parallel surface on spatial modulator 150, it carries the image stored on modulator 150 as it travels toward lens 175. The intensity distribution in beam 10 within crystal 180 is that of the Fourier transform of the image impressed on the surface at 150, as a result of the action of lens 175. A reflection phase hologram is therefore formed in crystal 180 that contains the Fourier transform of the image imposed on beam 10. Similarly, when beam 20 passes through lens 175, it forms a Fourier transformed image of the object within crystal 180.

The electric field in beam 40 depends on the product of the intensities of the three input beams 10, 20 and 30 and on the degree of correlation between the reference image and the object input scene, or to the product of the conjugate of the Fourier transform of the image in modulator 150 and the Fourier transform of the image of the object 80. Thus, beam 40 carries the cross-correlation between object 80 and image 150. This output is collimated by lens 175 and directed by reflection off beam splitter 160 and 127 to detector 190, carrying an intensity pattern dependant on the degree of cross-correlation. Detector 190 is a commercially available two-dimensional photo-detector array that produces an output signal in conventional format.

Figure 2:
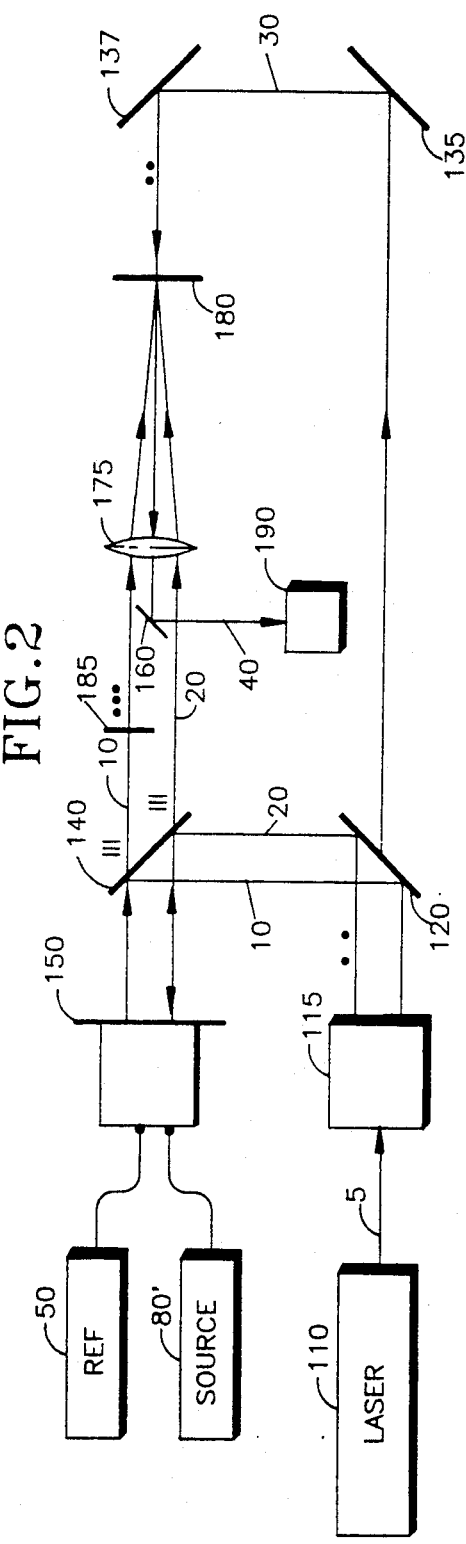
FIGS. 2 and 3 illustrate in partially pictorial, partially schematic form alternative embodiments of the invention.

Referring now to FIG. 2, there is shown an alternative embodiment of the invention. Both the reference 50 and source 80' use the same SLM, employing the upper and lower portions of its aperture, respectively. Source 80' comprises any source of data, such as a video camera putting out a raster signal that is displayed on SLM 150; a memory that recalls stored data that is likewise displayed; a two dimensional detector array at the focal plane of a telescope that is viewing some remote object, or any other means for converting images to raster data. Reference 50, as before, is any convenient source of reference data. It may include a fast memory in computer RAM, a hard disk, an optical disk, etc. together with electronics to present a signal to the display of modulator 150 in the correct format. In a case where the reference is fixed, such as in inspecting parts on an assembly line, it may be more economical to replace the upper portion of SLM 150 with a fixed reflective reference pattern. Laser 110 generates a beam that is expanded in telescope 115 to a size that will cover both portions of SLM 150. Two portions of this expanded beam are designated as beams 10 and 20 after being deflected upward by beamsplitter 120. These two beams are modulated by the respective patterns on the two output portions of SLM 150. In order to produce the polarization difference between beams 10 and 20, half wave plate 185 has been moved to a position in front of lens 175. Beam 30 is generated as before and directed through crystal 180 at the intersection of beams 10 and 20. Beam 40 will emerge on the same axis as beam 10, but has been displaced in the drawing for clarity. This configuration is more compact and economical, using only one SLM.

As a further variation, source 80' and the lower portion of SLM 150 may be replaced by alternative source 70, which may be any means of generating an image, such as a telescope followed by an incoherent to coherent converter such as that illustrated in SPIE Proceedings 465, 82 (1984). Beam 20 would then be the converted source image, not a modulated laser beam.

Figure 3:
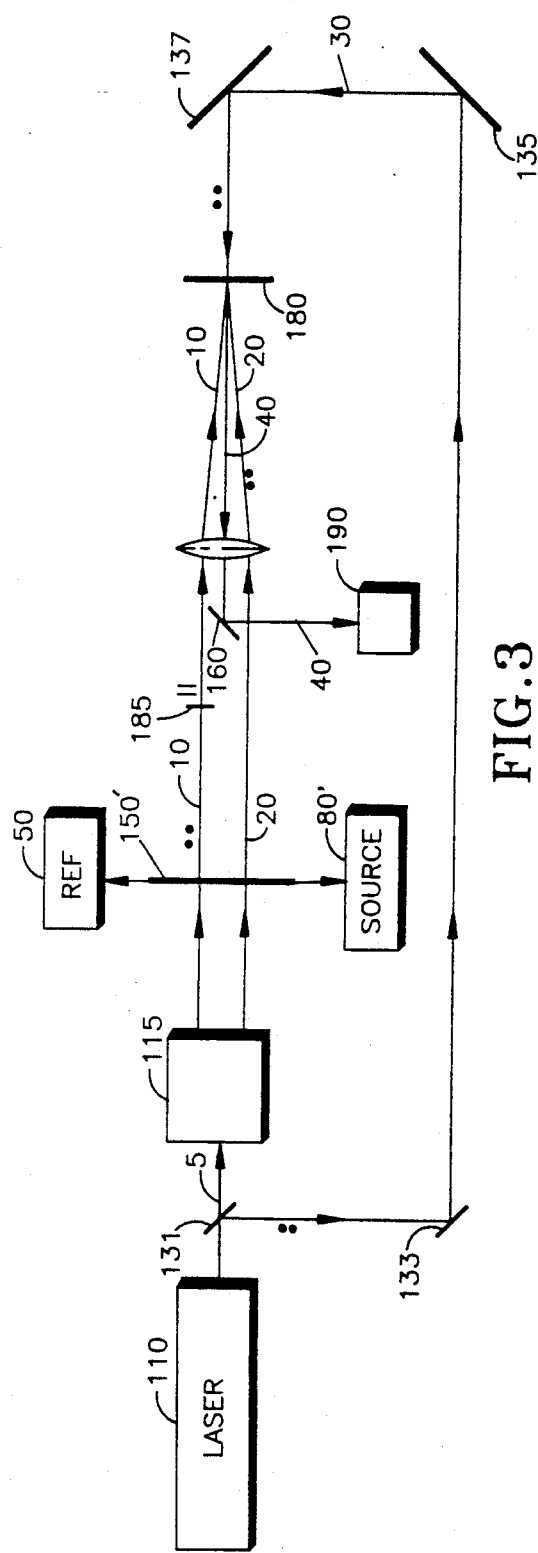

As a further variation shown in FIG. 3, beam 5 might be split in splitter 131 and transported along the bottom of the Figure by mirrors 133, 135, and 137 to deliver beam 30 as before. The remainder of beam 5 is expanded in telescope 115 to encompass two aperture regions that pass through alternate SLM 150', a conventional transmission modulator, to modulate the two beams 10 and 20.

In the prior art, the pump beams 20 and 30 were co-polarized in the crystal, so that the rate at which the data could be processed was limited by the response time required for an additional holographic grating between the pump beams to be formed and then to be erased before the next set of data could be processed. As a further advantage, coherent light is not required for the light from the object. Because the hologram within crystal 180 has properties determined by the output characteristics of laser 110, it will most efficiently reflect light having the same wavelength as that used to create the hologram When beams 10, 20 and 30 are collinear, and assuming a complete absence of optical activity within the crystal, three important conditions exist for polarizations illustrated in FIG. 2: 1) beams 10 and 30 write holographically a pattern that is read by beam 20 and returned colinearly as beam 40; 2) negligible holographic grating formation exists due to interaction between beams 20 and 30 since they are orthogonally polarized; 3) negligible holographic grating formation results from interaction between beams 10 and 20 since they are orthogonally polarized. Beam 20 thus reads (or reflects from) the holographic grating formed by interaction between beams 10 and 30. The readout information, now embodied as beam 40, is then propagated colinearly along beam 10, in a direction proceeding to the left of crystal 180, with polarization similar to that of beam 20.

When the beams are collinear, the spacing between fringes is smaller than for any other angle, thereby optimizing the configuration for high spatial frequency resolution in the interaction region of the crystal. Also, the reflectivity of the hologram is at a maximum for the smallest fringe spacing, in the absence of an applied field. For the case of applied fields, holographic writing sensitivity is enhanced at the cost of reduced conjugate reflectivity.

Many other embodiments will be evident to those skilled in the art. For example, the invention may be used as a spelling checker, in which the word being tested is fed in from the source and displayed in the upper half of SLM 150 and a reference list is in the lower half. If the word is on the list, there will be an intensity spike at the corresponding location in detector 190. As another example, the invention could be used in a computing system that performs a correlation between two sets of data, such as the answer sheet of a multiple-choice test and the correct answers. In that case source 80 might be a television camera that scans the answer sheets and impresses the raster image on SLM 150. As yet another example, the invention might be used in a security system to identify fingerprints. The source would contain the sample and the reference would contain a set of fingerprints of authorized users for comparison.

Those skilled in the art will readily be able to devise other optical configurations employing the principles of the invention. For example, the polarizations of beams 10 and 20 might be reversed. In that case, the grating would be written between the input beam 20 and beam 30. This embodiment would be useful when it is necessary to compare a number of references with a relatively slowly-varying input. Also, the roles of beams 10 and 30 could be reversed, and an unmodulated beam 10 could travel from the left along with beam 20 to interact with beam 30, carrying the reference image.

Referring now to FIG. 4, there is shown a preferred embodiment of crystal 180. It consists of a photoconductive crystal capable of exhibiting the linear Pockels effect, such as BSO, BGO, GaAs, etc., aligned with its crystal axis perpendicular to the parallel faces. The thickness will depend on a tradeoff between improved diffraction efficiency and other effects, such as self pumping that increase with thickness. Thicknesses of the materials listed are typically between 1 and 4 mm, depending on the material's optical properties. Transparent electrodes 330 are deposited on opposite faces and connected to electrical contacts 322. A suitable material will be chosen for a particular application depending on its conductive, transmissive and thermal properties. A conventional antireflection coating 330 is applied on the outer surfaces.

Prior work in DFWM applications would often use a configuration in which the two pump beams were collinear and the probe beam entered at some convenient acute angle with respect to the pump beam axis. In that case, it would optimize the nonlinear effect to orient the crystal so that the crystal axis having the highest electrooptic coefficient was either: 1) parallel to the general propagation direction of the beams if in the reflection mode; or 2) orthogonal to and in the plane of incidence of the intersecting beams if in the transmission mode. If such prior art configurations were applied to the general layout shown in the Figures, the transmission mode geometry would require that the crystal have its applied electric field oriented orthogonally (and in the plane of the page) to the horizontal pump beams 20 and 30, and that the crystal electrodes be placed on the edges of the crystal, at the top and bottom in the drawings. Similarly, if the reflection configuration were employed, the geometry would require that the crystal have its applied electric field oriented parallel to the horizontal pump beams 20 and 30, and that the crystal electrodes somehow be placed on the large surfaces (faces) of the crystal. In the latter case, only a volume reflection hologram can exist in the material, and it cannot be appreciably enhanced by a transverse field.

The use of cross-polarized pump and probe beams also serves to provide greater speed of system response, because it is not necessary to wait between frames while a probe-pump grating is erased from the crystal. In addition, the signal to noise ratio of the desired output is improved by the omission of such a secondary grating, which would contribute to scattering noise. The probe beam thus acts solely as a readout beam, without writing a grating that is not used in this system. The reflection phase hologram within the crystal is formed by beam 10 from the reference and the fixed pump beam 30. The reference will be fixed or will be written with a new pattern in a time that is relatively long compared to the time to enter input data. For example, the reference may be a matrix and the source may be the input vector that is to be multiplied by the matrix, or the reference may be a set of coefficients or reference function for a Fourier transform or for a convolution.

It should be understood that the invention is not limited to the particular embodiments shown and described herein, but that various changes and modifications may be made without departing from the spirit and scope of this novel concept as defined by the following claims.

What is claimed is:

1. An optical correlation system comprising a source of coherent light, a photorefractive crystal capable of sustaining a degenerate four wave mixing process, a source of a reference image, and beam transmission means for directing first and second beams and an image beam through said crystal in an interaction region of said crystal to form an output beam through the degenerate four wave mixing process, characterized in that:

said beam transmission means comprises means for modulating a first beam (10) from said source of coherent light with said reference image to form a reference beam and for directing said reference beam through said interaction region along a first axis and in a first polarization state;

said beam transmission means further comprises means for directing an image beam (20) from said source of coherent light, having a source image modulation pattern impressed thereon, through said interaction region along an image axis at a grazing angle with respect to said first axis and in an image polarization state substantially orthogonal to said first polarization state, and;

said beam transmission means further comprises means for directing a second beam (30) from said source of coherent light through said interaction region in a second polarization state substantially parallel to said first polarization state and along a second axis, whereby said first and second beams form a volume phase reflection hologram in said crystal, said image beam interacts with said volume phase reflection hologram, and the degenerate four wave mixing process generates said output beam having a correlation modulation pattern impressed thereon.

2. A system according to claim 1, further characterized in that said first and said image beams enter said crystal from a first side and said second beam enters said crystal from a second side opposite said first side, whereby said volume reflection phase hologram depends on said reference image.

3. A system according to claim 2, further characterized in that said first and said image axes are separated by a predetermined offset distance at a predetermined displacement distance from said first side and intersect in said interaction region, and in that said first and said second axes are substantially collinear.

4. A system according to claim 3, further characterized in that said first and image axes intersect spatial light modulator means disposed at said predetermined displacement distance, said first axis passing through a reference portion of said spatial light modulator means carrying a pattern dependent on said reference image;

said image axis passing through an image portion of said spatial light modulator carrying a pattern dependent on said source image; and said spatial light modulator means further comprises data storage means coupled to said reference portion, whereby said reference image is coupled to said reference portion and said spatial light modulator means further comprises optoelectronic video input means coupled to said image portion for converting an input image to said source image modulation pattern.

5. A system according to claim 1, further characterized in that said first beam and said second beam are substantially collinear, whereby said volume reflection phase hologram is optimized for highest spatial resolution with respect to said input source image modulation pattern.

* * * * *